United States Patent [19]

Krueger

[11] Patent Number: 4,976,085
[45] Date of Patent: Dec. 11, 1990

[54] CONSTRUCTION PLATE

[76] Inventor: Robert E. Krueger, 3920 Tracewood La., Boynton Beach, Fla. 33436

[21] Appl. No.: 486,303

[22] Filed: Feb. 28, 1990

[51] Int. Cl.$^5$ .......................... E04B 1/38; E04C 5/00; B25G 3/00
[52] U.S. Cl. .................................. 52/715; 403/232.1; 403/403
[58] Field of Search ...................... 52/92, 93, 712–715; 403/171, 174, 178, 176, 217, 232.1, 400, 403, 405.1; 411/461–467

[56] References Cited

U.S. PATENT DOCUMENTS

| 3,256,030 | 6/1966 | Banse | 403/400 |
| 4,270,330 | 6/1981 | Townsend | 52/712 |
| 4,498,801 | 2/1985 | Gilb | 403/232.1 |
| 4,572,695 | 2/1986 | Gilb | 403/405.1 |
| 4,669,235 | 6/1987 | Reinen | 403/403 |

Primary Examiner—Neill R. Wilson
Attorney, Agent, or Firm—Leon Gilden

[57] ABSTRACT

A construction plate as configured including a central body with a plurality of opposed legs directed outwardly of the central body with a plurality of opposed flanges mounted to a plurality of bend lines relative to the central body to permit securement of a construction stud in a selective orientation within the opposed flanges. The organization permits utilization of the multi-purpose construction plate for joining various horizontal construction stud members to various vertical stud members as well as joining roof trusses to horizontal construction studs.

7 Claims, 5 Drawing Sheets

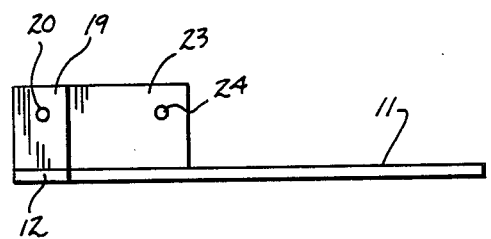
FIG 3
FIG 4
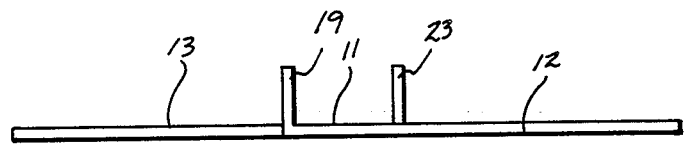

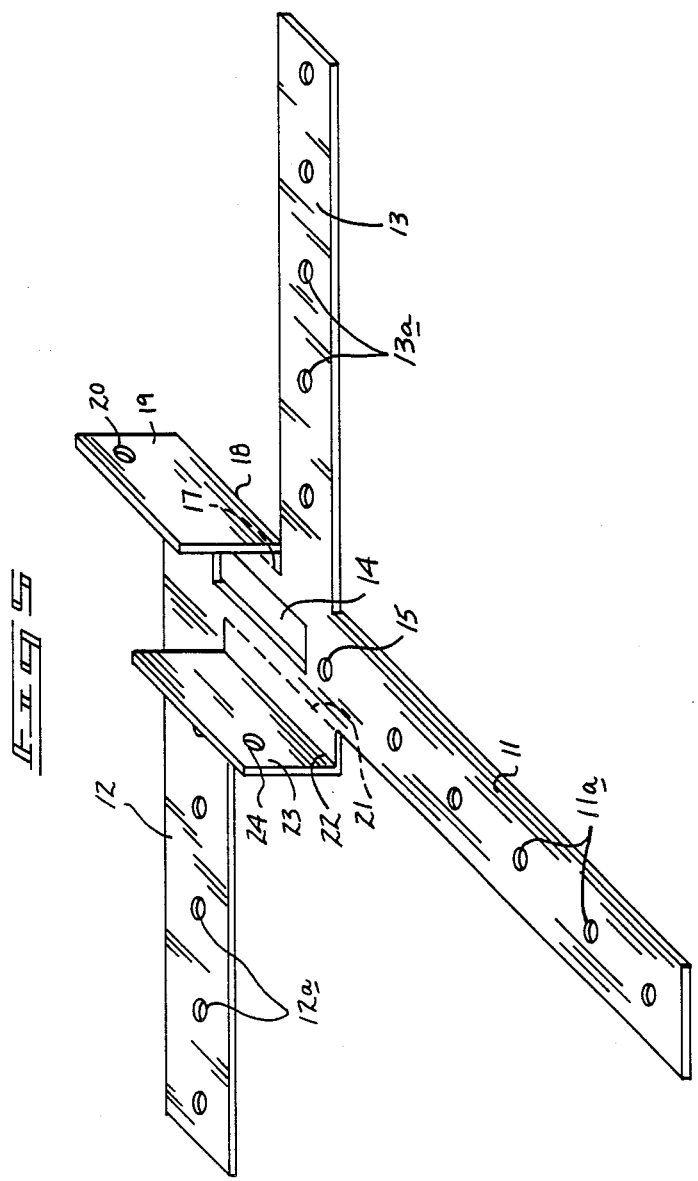

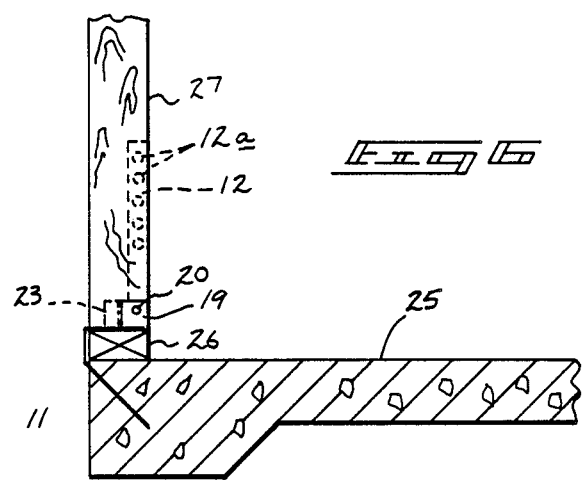
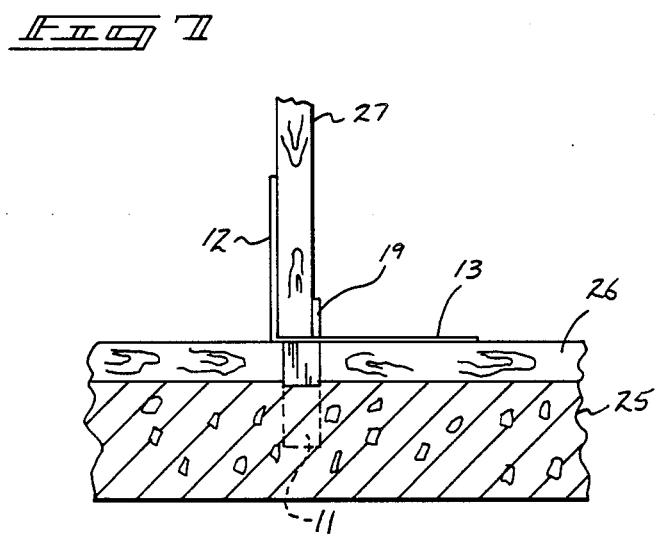

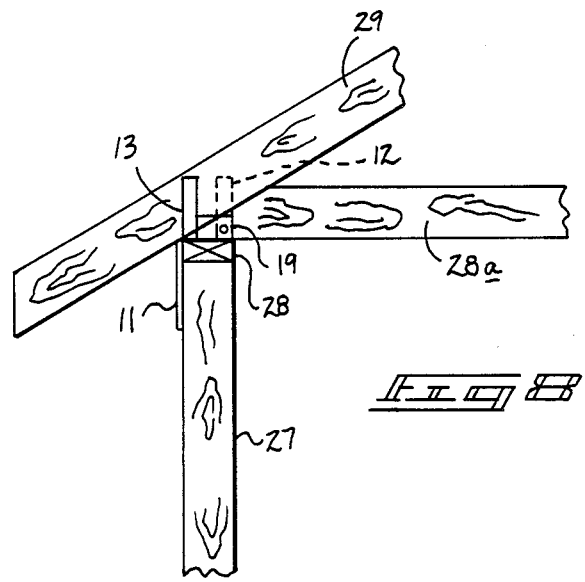
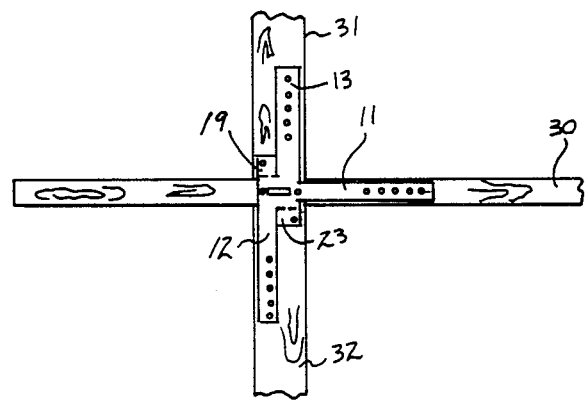

CONSTRUCTION PLATE

BACKGROUND OF THE INVENTION

1. Field of the Invention

The field of the invention relates to construction plate members, and more particularly pertains to a new and improved construction plate wherein the same is configured to permit securement of various construction studs in a plurality of orientations within the construction plate as well as permitting joining of various construction studs together and to a underlying concrete slab in a selective manner accommodating various requirements in boating construction.

2. Description of the Prior Art

The prior art has provided variously configured construction flange arrangements to permit securement of construction studs or plates together. The instant invention attempts to overcome the disadvantages of the prior art by permitting joiner of various construction studs in a variety of configurations and accommodating conventional joint constructions as utilized in the construction trade. Examples of the prior art include U.S. Pat. No. 4,361,999 to SIDNEY sets forth a transverse support member for securing a weight bearing portion wall positioned therebetween wherein the member is of a generally V or trough shaped configuration for securement between opposing joists.

U.S. Pat. No. 4,669,243 to GORE et al sets forth a truss support plate arrangement for positioning and securing opposing joists in a spaced relationship relative to one another.

U.S. Pat. No. 4,653,242 to EZARD sets forth a support beam plate structure defined as an elongate plate of a generally U-shaped configuration for securement about upper and side surface portions of butt-joined beams for securement of the beams wherein the plate member further includes protrusions directed interiorly for direction into the beam to assist in positioning of securement of the beam portions therewithin the member.

U.S. Pat. No. 4,541,218 to GOTTLIEB provides a web member of a generally V-shaped configuration to inter-connect two elongate wooden joist type members in a spaced relationship relative to one another.

U.S. Pat. No. 4,241,557 to JENSEN sets forth a construction member of a plate like configuration utilizing a central web in spaced flange plates mounted orthogonally and hingedly to the central plate.

As such, it may be appreciated that there continues to be a need for a new and improved construction plate member as set forth by the instant invention which addresses both the problems of ease of use as well as adaptability to a variety of joist and beam joint configurations to permit securement and ensure geometrical integrity of the joint structures and in this respect, the present invention substantially fulfills this need.

SUMMARY OF THE INVENTION

In view of the foregoing disadvantages inherent in the known types of construction members now present in the prior art, the present invention provides a new and improved construction plate wherein the same sets forth a plate member utilizing a plurality of leg portions extending laterally of a central body with flange portions bendably mounted relative to the central body to accommodate various joist and beam joint constructions. As such, the general purpose of the present invention, which will be described subsequently in greater detail, is to provide a new and improved construction plate which has all the advantages of the prior art construction plate arrangements and none of the disadvantages.

To attain this, the present invention substantially includes a construction plate as configured including a central body with a plurality of opposed legs directed outwardly of the central body with a plurality of opposed flanges mounted to a plurality of bend lines relative to the central body to permit securement of a construction stud in a selective orientation within the opposed flanges. The organization permits utilization of the multi-purpose construction plate for joining various horizontal construction stud members to various vertical stud members as well as joining roof trusses to horizontal construction studs.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved construction plate which has all the advantages of the prior art construction plates and none of the disadvantages.

It is another object of the present invention to provide a new and improved construction plate which may be easily and efficiently manufactured and marketed.

It is a further object of the present invention to provide a new and improved construction plate which is of a durable and reliable construction.

An even further object of the present invention is to provide a new and improved construction plate which is susceptible of a low cost of manufacture with regard to both materials and labor, and which accordingly is then susceptible of low prices of sale to the consuming public, thereby making such construction plates economically available to the buying public.

Still yet another object of the present invention is to provide a new and improved construction plate which provides in the apparatuses and methods of the prior art some of the advantages thereof, while simultaneously overcoming some of the disadvantages normally associated therewith.

Still another object of the present invention is to provide a new and improved construction plate which may be compactly stored when not being utilized.

Yet another object of the present invention is to provide a new and improved construction plate wherein a central body member includes a plurality of leg members and flange members bendably articulated relative to the central body to permit accommodation of variously configured joist and truss portions to secure such portions to various construction plates.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view taken in elevation of the instant invention.

FIG. 4 is an orthographic rear view taken in elevation of the instant invention.

FIG. 5 is an isometric illustration of the instant invention.

FIG. 6 is an orthographic side view taken in elevation illustrating the instant invention mounting a wall stud to a floor plate.

FIG. 7 is an orthographic rear view taken in elevation of the invention as illustrated in FIG. 6.

FIG. 8 is an orthographic side view taken in elevation of the instant invention utilized in securing a roof truss to a vertical stud member and top plate stud intersection.

FIG. 9 is a top orthographic view of the instant invention utilized in a further construction joint arrangement.

DESCRIPTION OF THE PREFERRED EMBODIMENT

Figure 1:
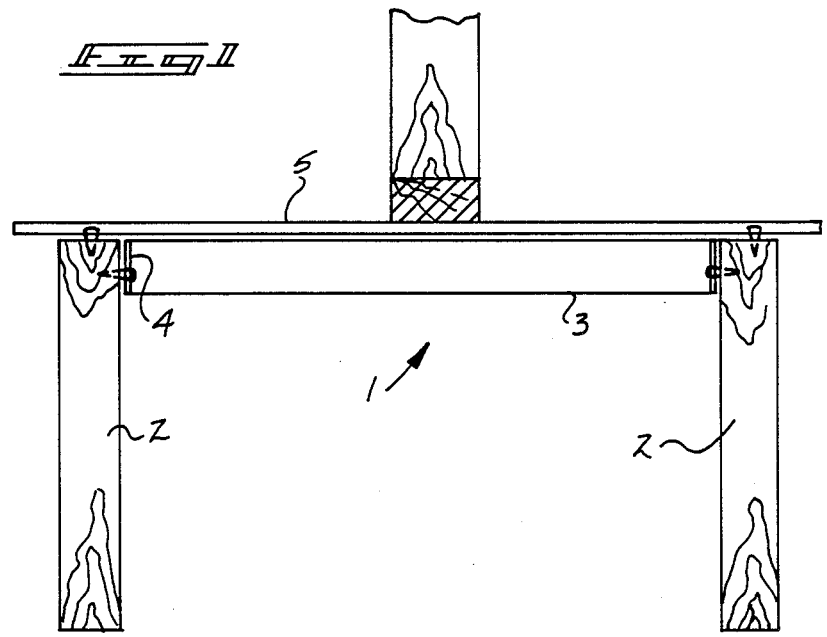
FIG. 1 is an orthographic view taken in elevation of a prior art construction plate arrangement.
Figure 2:
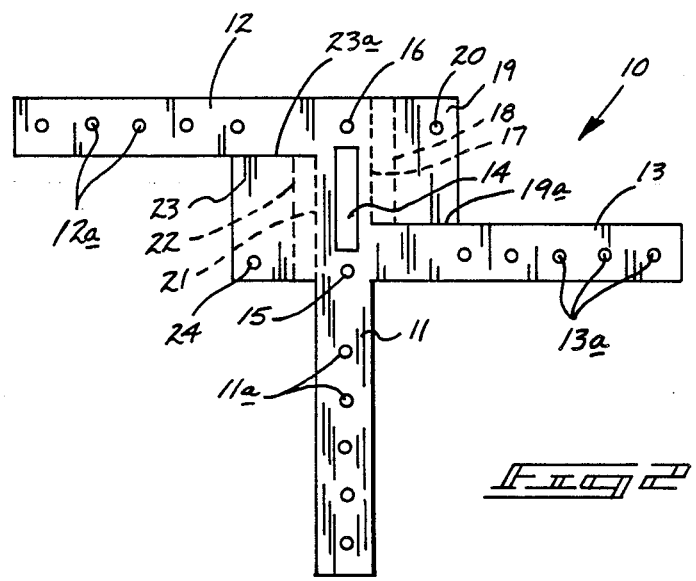
FIG. 2 is a top orthographic view of the instant invention.

With reference now to the drawings, and in particular to FIGS. 1 to 9 thereof, a new and improved construction plate embodying the principles and concepts of the present invention and generally designated by the reference numeral 10 will be described.

FIG. 1 illustrates a prior art construction plate member 1 configured as a generally V-shaped member 3 for securing a plurality of joists 2 therebetween at joint intervals 4 to support a wall bearing member 5 (U.S. Pat. No. 4,361,999).

More specifically, the construction plate member 10 of the instant invention essentially comprises a deformable rigid body member including elongate central body leg 11 coextensively formed to a rear leg 12 orthogonally joined relative to the central body leg 11 and directed laterally of a left side of the central body leg 11 with a forward leg 13 directed orthogonally and integrally formed to the central body leg 11 and extending orthogonally relative to a elongate right side edge of the central body leg 13. The central body leg 11 as well as the rear and forward legs 12 and 13 respectively are each formed of parallel elongate side edges. A central leg 11 includes a series of central leg apertures 11a directed orthogonally through central leg forwardly of the forward leg 13 with the rear leg 12 formed with a series of rear leg apertures 12a and the forward leg 13 formed with a series of orthogonally through extending forward leg apertures 13a. These apertures are utilized in permitting securement utilizing such typical fasteners as nails, screws, and the like to associated joists and stud members. Further, the central body leg 11 further includes a elongate central slot 14 positioned and extending from an intersection defined by the forward leg 13 and the central body leg 11 extending rearwardly to an intersection defined by the rear leg 12 and the central body leg 11. A forward and rear aperture 15 and 16 respectively are formed through the central body leg 11 forwardly and rearwardly of the central slot 14 also at intersections defined between the central body leg 11 and the forward leg 13 and the rear leg 12 respectively.

A right flange plate 19 is bendably along a bend line mounted to the right side edge of the central body leg 11 and coextensive therewith from a right side edge of the forward leg 13 rearwardly thereof along the central body leg 11. The right flange plate 19 includes a first bend line 17 aligned with the right side edge of the central body leg 11 and a second bend line 18 spaced in a parallel relationship relative to the first bend line along the right flange plate 19. The first and second bend lines 17 and 18 permit selective and convenient bending of the right flange plate 19 relative to the central body leg 11. A right flange plate aperture 21 is directed through the right flange plate 19 adjacent a rear edge and right edge intersection of the flange plate to accommodate a fastener therethrough of a type as noted above. Similarly, a left flange plate 23 is integrally joined to the left side edge of the central body leg 11 defining a rear flange plate edge 23a similarly a forward edge 19a is formed to the right flange plate 19 at an intersection between the right flange plate 19 and the forward leg 13 defining a boundary therebetween. The left flange plate 23 defines a similar boundary line between the rear edge 23a and the rear leg 12. The left flange plate 23 includes a left plate first bend line 21 defining a common border between the central leg 11 and the left flange plate 23 with a left flange plate second bend line 22 parallel to and spaced from the first bend line 21 along the left flange plate 23 to also provide a plurality of bend lines wherein the left flange plate 23 is easily bent orthogonally thereto. In this manner (see FIG. 5 for example) a joist or stud member of a typical two by four construction is received between the flange plates in an edge to edge or side to side relationship between the flange plates for construction purposes. Further, a left flange plate aperture 24 is formed between a forward edge of the left flange plate 23 and a left side edge of the flange plate 23 to accommodate a fastener therethrough to again assist in securing the flange plate and associated flange plate 10 to associated construction members.

In use, the flange plates 19 and 23 are orthogonally formed relative to the construction plate organization to accommodate various joist and stud members therewithin such as illustrated in FIG. 6 for example wherein a concrete slab 25 receives the central body leg 11 therewithin prior to its curing and wherein the central body leg 11 is "wrapped" about a horizontal floor plate 26 and wherein the rear leg 12 is bent along its intersection with the left edge of the central body leg 11 and directed orthogonally upwardly to secure a vertical stud member 27 relative to the floor plate 26 and the construction plate 10. The right and left flange plates 19 and 23 are bent upwardly along their respective bend lines 17 and 21 to receive the vertical stud member 27 in a face to face relationship therebetween. The forward leg 13 mounted and secured to the horizontal floor plate 26 in a face to face relationship as illustrated in FIG. 7.

Further application of the instant invention as illustrated in FIGS. 8 and 9 permits mounting of a vertical stud member 27 to a roof truss 29 and a top plate stud 28. As illustrated, the central body leg 11 is bent downwardly in a face to face engaging relationship with the vertical stud member 27 along a side edge surface thereof with the flange plates 19 and 23 engaging side surfaces of a roof stud 28a mounted on the top plate stud 28 with the rear and forward legs 12 and 13 directed upwardly along formed bend lines between the right and left sides of the central body 11 to engage the roof truss 29. FIG. 9 illustrates the construction plate 10 utilized to secure spaced studs 31 and 32 to a central stud 30.

As to the manner of usage and operation of the instant invention, the same should be apparent from the above disclosure wherein the construction stud 10 is configured and arranged to accommodate various joist and stud intersections and join the same in a secure and integral manner. Further, it should be noted that further apertures may provided within the flange plate 19 and 23 as required.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A construction plate for effecting joinder of a plurality of construction studs wherein the construction plate comprises,
    a deformable rigid member, the member including an elongate longitudinally aligned central body leg, the central body leg including a central body leg right side edge and a central body leg left side edge and a central body leg rear end edge and a central body leg forward end edge, the central body leg integrally joined to a rear leg joined at a first intersection to the central body leg, the rear leg including a rear leg right side edge and a rear leg left side edge wherein rear leg right side edge and left side edge are parallel relative to one another and arranged orthogonally and integrally to the central body leg left side edge wherein the rear leg right side edge is coextensive with the central body leg end edge, and
    a forward leg including a forward leg right side edge and a forward leg left side edge wherein the forward leg is integrally joined to the right side edge of the central body leg orthogonally and integrally thereto at a second intersection line, and
    further including a right flange plate bendably joined to the central body leg right side edge coextensive therewith between the forward leg left side edge and the central body leg rear end edge, and
    a left flange plate bendably joined to the left side edge of the central body plate between the rear leg left side edge extending forwardly thereof along the central body leg left side edge coextensive with the right side edge of the forward leg, and
    wherein the central body leg includes a central slot directed therethrough wherein the central slot is formed through the central body leg extending from the first intersection line to the second intersection line of the rear leg and the forward leg.

2. A construction plate as set forth in claim 1 further including a plurality of central leg apertures directed forwardly of the second intersection line through the central body leg to receive fasteners therethrough.

3. A construction plate as set forth in claim 2 further including a series of rear leg apertures directed through the rear leg forwardly of the first intersection line.

4. A construction plate as set forth in claim 3 wherein the forward leg includes a plurality of forward leg apertures directed forwardly of the second intersection line.

5. A construction plate as set forth in claim 4 wherein the right flange plate is bendably mounted to the central body leg selectively along a first bend line coextensively aligned with the right side edge of the central body plate and wherein the right flange plate includes a second bend line spaced from the first hinge line formed along the right flange plate.

6. A construction plate as set forth in claim 5 wherein the left flange plate includes a further bend line coextensive with the left side edge of the central body leg and a yet further hinge line spaced parallel to the further bend line along the left flange plate.

7. A construction plate as set forth in claim 6 wherein the right flange plate and the left flange plate include at least one aperture directed through each of the right and left flange plates.

* * * * *